United States Patent
Kaluskar et al.

(10) Patent No.: US 9,489,424 B2
(45) Date of Patent: Nov. 8, 2016

(54) CURSOR PRE-FETCHING

(75) Inventors: Sanjay Kaluskar, Menlo Park, CA (US); Sreenivas Gollapudi, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2363 days.

(21) Appl. No.: 11/018,101

(22) Filed: Dec. 20, 2004

(65) Prior Publication Data

US 2006/0149702 A1     Jul. 6, 2006

(51) Int. Cl.
| | |
|---|---|
| G06F 15/16 | (2006.01) |
| G06F 17/30 | (2006.01) |
| H04L 29/08 | (2006.01) |
| H04L 12/861 | (2013.01) |
| H04L 12/70 | (2013.01) |

(52) U.S. Cl.
CPC ..... *G06F 17/3048* (2013.01); *G06F 17/30477* (2013.01); *G06F 17/30501* (2013.01); *H04L 49/9005* (2013.01); *H04L 67/2847* (2013.01); *G06F 17/3041* (2013.01); *H04L 2012/5681* (2013.01)

(58) Field of Classification Search
CPC ............... H04L 2012/5681; H04L 49/9005; H04L 67/2847; G06F 17/3048; G06F 17/3041; G06F 17/30477; G06F 17/30501
USPC ............... 707/2, 713, 619; 709/217
See application file for complete search history.

(56) References Cited

U.S. PATENT DOCUMENTS

| | | | |
|---|---|---|---|
| 5,289,470 A | * | 2/1994 | Chang et al. ............. 711/173 |
| 5,754,771 A | * | 5/1998 | Epperson et al. ........... 709/203 |
| 5,774,668 A | | 6/1998 | Choquier et al. |
| 5,802,523 A | * | 9/1998 | Jasuja et al. |
| 5,890,167 A | | 3/1999 | Bridge, Jr. et al. |
| 5,918,059 A | | 6/1999 | Tavallaei et al. |

(Continued)

FOREIGN PATENT DOCUMENTS

| | | |
|---|---|---|
| EP | 0 992 909 A2 | 4/2000 |
| WO | WO 02/05116 A2 | 1/2002 |
| WO | WO 02/097676 A2 | 12/2002 |

OTHER PUBLICATIONS

Gray, Neil; "A Beginners C++"; 1996; pp. 1-67; retrieved at http://www.uow.edu/au/~nabg/ABC/ABC.html on Dec. 2, 2009.*

(Continued)

*Primary Examiner* — Oleg Survillo
(74) *Attorney, Agent, or Firm* — Hickman Palermo Becker Bingham LLP; Marcel K. Bingham

(57) ABSTRACT

Techniques determine a quantity of rows to fetch based on memory available on a client computer and the fetch state of cursors. The techniques are used to determine a quantity of rows for "pre-fetching". Under pre-fetching, rows in addition to those requested by an application are fetched from a database instance and stored in a "pre-fetch buffer". The pre-fetch quantities are based on an amount of memory that is deemed available for pre-fetch buffers on a client computer and the number of cursors in the fetch state for a session at a given moment. Pre-fetching is used to hasten session migration. By fetching a quantity of rows that is larger than would be fetched if only the application-specified quantity were fetched, the fetch phase of a cursor is completed sooner. An earlier completion of the fetch phase of a session's cursors allows migration of the session to be completed sooner.

18 Claims, 7 Drawing Sheets

(56) References Cited

U.S. PATENT DOCUMENTS

| | | | |
|---|---|---|---|
| 6,035,379 | A | 3/2000 | Raju et al. |
| 6,038,562 | A * | 3/2000 | Anjur et al. |
| 6,041,357 | A * | 3/2000 | Kunzelman et al. ......... 709/228 |
| 6,088,728 | A | 7/2000 | Bellemore et al. |
| 6,178,529 | B1 | 1/2001 | Short et al. |
| 6,243,751 | B1 | 6/2001 | Chatterjee et al. |
| 6,327,622 | B1 | 12/2001 | Jindal et al. |
| 6,421,715 | B1 * | 7/2002 | Chatterjee et al. .......... 709/219 |
| 6,556,659 | B1 | 4/2003 | Bowman-Amuah |
| 6,587,866 | B1 | 7/2003 | Modi et al. |
| 6,601,101 | B1 | 7/2003 | Lee et al. |
| 6,728,748 | B1 | 4/2004 | Mangipudi et al. |
| 6,816,907 | B1 | 11/2004 | Mei et al. |
| 6,822,966 | B2 * | 11/2004 | Putcha et al. ................. 370/411 |
| 6,973,457 | B1 * | 12/2005 | Bastawala et al. .......... 707/770 |
| 7,058,957 | B1 | 6/2006 | Nguyen |
| 7,174,379 | B2 | 2/2007 | Agarwal et al. |
| 7,178,050 | B2 | 2/2007 | Fung et al. |
| 7,263,590 | B1 | 8/2007 | Todd et al. |
| 7,269,157 | B2 | 9/2007 | Klinker et al. |
| 7,743,333 | B2 * | 6/2010 | Bastawala et al. .......... 715/738 |
| 2001/0056493 | A1 | 12/2001 | Mineo |
| 2002/0073139 | A1 | 6/2002 | Hawkins et al. |
| 2002/0129157 | A1 | 9/2002 | Varsano |
| 2002/0143728 | A1 * | 10/2002 | Cotner et al. ..................... 707/1 |
| 2002/0194015 | A1 | 12/2002 | Gordon et al. |
| 2003/0007497 | A1 | 1/2003 | March et al. |
| 2003/0014523 | A1 | 1/2003 | Teloh et al. |
| 2003/0088671 | A1 | 5/2003 | Klinker et al. |
| 2003/0108052 | A1 | 6/2003 | Inoue et al. |
| 2003/0135642 | A1 | 7/2003 | Benedetto et al. |
| 2003/0208523 | A1 | 11/2003 | Gopalan et al. |
| 2004/0024979 | A1 | 2/2004 | Kaminsky et al. |
| 2004/0111506 | A1 | 6/2004 | Kundu et al. |
| 2004/0117794 | A1 | 6/2004 | Kundu |
| 2004/0176996 | A1 | 9/2004 | Powers et al. |
| 2004/0268357 | A1 | 12/2004 | Joy et al. |
| 2005/0021771 | A1 | 1/2005 | Kaehn et al. |
| 2005/0165925 | A1 | 7/2005 | Dan et al. |
| 2005/0239476 | A1 | 10/2005 | Betrabet et al. |
| 2005/0267965 | A1 | 12/2005 | Heller |
| 2006/0036617 | A1 | 2/2006 | Bastawala et al. |
| 2007/0226323 | A1 | 9/2007 | Halpern |

OTHER PUBLICATIONS

Ravi Kokku et al., "Half-pipe Anchoring: An Efficient Technique for Multiple Connection Handoff," Proceedings $10^{th}$ International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

International Searching Authority, "Notification of Transmittal of the International Search Report and the Written Opinion of the International Searching Authority, or the Declaration," dated Dec. 3, 2004, 12 pages.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

* cited by examiner

CURSOR PRE-FETCHING

The present application is related to the following U.S. patent application Ser. No. 10/917,953, Transparent Session Migration Across Servers, filed by Sanjay Kaluskar, et al. on Aug. 12, 2004 and incorporated herein by reference.

FIELD OF THE INVENTION

The present invention relates to fetching of cursor result sets, and particular, to performing such fetching more efficiently.

BACKGROUND OF THE INVENTION

Many enterprise data processing systems rely on multi-node database servers to store and manage data. Such enterprise data processing systems typically follow a multi-tier model that has a multi-node database server in the first tier, and one or more computers in the middle tier and outer tiers.

FIG. 1 depicts multi-node database server mds11, which is implemented on multi-tier architecture 10. A server, such as multi-node database server mds11, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a multi-node computer system can be allocated to run a particular server's software. A particular combination of the software on a node and the allocation of the resources from the node is a server that is referred to herein as a server instance or instance. Thus, a multi-node server comprises multiple server instances that can run on multiple nodes. Several instances of a multi-node server can even run on the same node.

A database server governs and facilitates access to a particular database, processing requests by clients to access the database. A multi-node database server, such as multi-node database server mds11, comprises multiple "database instances", each database instance running on a node. Multi-node database server mds11 governs access to database db11. A multi-node database server can govern and facilitate access to one or more databases.

The middle-tier of multi-tier architecture 10 includes middle-tier computer cmp11 and the outer-tier includes user computer cmp12. User computer cmp12 executes browser br11, which interacts with an end-user. The end-user's interaction with browser br11 causes the browser to transmit requests over a network, such as the Internet, to middle-tier computer cmp11. The request causes a process on middle-tier computer cmp11, client cl11, to execute application appl11. Execution of application appl11 by the client cl11 causes client cl11 to connect to multi-node database server mds11. For example, application appl11 may be an order entry application that is configured to receive order requests from browser br11. Data for the order entry application is stored in db11. To process the requests, execution of application appl11 by client cl11 causes client cl11 to connect to database db11. Once connected, client cl11 issues database statements to retrieve and manipulate data stored in database db11.

The tier that directly connects to a server, relative to other tiers in a multi-tier architecture, is referred to herein as containing the client of the server. Thus, client process cl11 is referred to herein as the client of multi-node database server mds11.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

An application, such application appl11, interacts with a multi-node database server mds11 via client-side interface component intcomp11. Execution of application appl11 causes client cl11 to execute client-side interface component intcomp11 to interact with multi-node database server mds11. Application appl11 includes invocations of routines (e.g. functions, procedures, object methods, remote procedures) of client-side interface component intcomp11. Applications are typically developed by vendors and development teams different from those that develop servers and interfaces to servers, such as multi-node database server mds11 and client-side interface component intcomp11.

In order for a client to interact with multi-node database server mds11, a session is established for the client on a database instance of multi-node database server mds11. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session. A database component is a set of software modules that provide specialized and related functions for a database server, and shall be described later in greater detail. An example of a database component is a Java execution engine.

The beginning and end of a session demarcates a unit of work. Often, the beginning of a database session corresponds to an end-user establishing an interactive session with an application via, for example, a browser, and ends when the end-user logs off. Thus, the beginning and ending of the database session depend on application logic and end-user action, and may not be controlled by a server on which the session is established.

Client-Side Interface Components

Client-side interface components, such as client-side interface component intcomp11, are software components that reside and are executed on the same computer of a client of a server, and that are configured to provide an interface between the client and the server. The client-side interface component intcomp11 is configured for performing the detailed operations needed to interface with multi-node database server mds11. For example, application appl11 invokes a function of client-side interface component intcomp11 to establish a connection to multi-node database server mds11. The client-side interface component then handles the details of a connection on a particular instance of multi-node database server mds11. To make requests of multi-node database server mds11, such as a request for execution of a query, application appl11 is configured to invoke functions of client-side interface component intcomp11, which then transmits a request for the same to the node and database instance on which the session is established.

Client-side interface component intcomp11 may generate and/or access state that is hidden from other software modules, that is, is not or may not be referenced and accessed by other software modules, and in particular, by application appl11. Such state is referred to as being internal or private to client-side interface component intcomp11.

For example, to create a database session on a multi-node database server mds11, application appl11 invokes a routine of client-side interface component intcomp11. The client-side interface component establishes a database session on a particular database instance within multi-node database server mds11, and stores details about the database session within internal data structures or objects. Such data structures and objects define, for example, the session established for an application, and specify such values as an identity of a session on a database instance, the name of the database instance, and a network address and port number for the connection to the database instance.

Such details of the session are not returned to application appl11, nor may application appl11 access the details. Instead, what is provided to application appl11 is an "external identifier" for the session, such as a value that internal data of client-side interface component intcomp11 maps to the session, or a reference to an object generated by client-side interface component intcomp11 to store some details of the session in private attributes of the object that are inaccessible to application appl11. In this way, application appl11 does not "know" of the specific details of the session that has been established for it; however, application appl11 has the information needed to be able to identify to client-side interface component intcomp11 the particular session that has been established for application appl11.

Execution of Database Statements

Once a database session is established for an application, the application may request that a database server execute a query by invoking a function of a client-side interface component. Processing a request to execute a database statement goes through phases, each phase corresponding to particular types of operation. The phases include (1) creating a cursor, (2) parsing the query and binding its variables, (3) computing the query, (4) fetching rows to return for the query, and (5) closing the cursor. These phases are described in greater detail in *Oracle8 Server Concepts*, Release 8.0, Volume 3 (the contents of which incorporated herein by reference).

A cursor is an area of memory used to store information about a parsed query and other information related to the execution of the query. A cursor is part of a session's state. The rows computed for a query are referred to as the result set of the query or of the cursor created for the query.

A cursor may have various cursor states. Once the cursor is created, it is referred to being as being in the "opened state", or as being opened, until it is in the "closed state", or is closed. The cursor becomes closed under a variety of circumstances. For example, a cursor is closed once the entire result set for the query is computed, or once an application explicitly closes a cursor by issuing a command via the client-side interface component to close the cursor.

When the processing of a query is at a particular phase, its cursor may be referred to as being in a state corresponding to the phase. For example, when a cursor is in the phase for fetching rows, it may be referred to as being in the fetch state. When a cursor is in the phase for parsing a query and binding its variables, the cursor may be referred to as being in the parsing and binding state.

When a cursor is closed, it may be retained by a database server so that the cursor may be re-used in case the application again requests execution of the same query within the current database session. Retaining cursors in this way avoids having to repeat for an identical query the operations of creating a cursor and parsing the database statement and binding its variables, which can be expensive operations.

Application Fetching and Performance Considerations

While in the fetch state, the result set of a cursor is fetched by the client-side interface component, which furnishes the fetched rows to the application. The application may request rows from the result set one row at a time. In response, the client-side interface component fetches a row from the database server, by transmitting a fetch request for a row from the result set.

Each fetch request by a client-side interface component for a row entails transmission of the request across a network to the database server and transmission of the requested rows to the client-side interface component. To reduce such network traffic, "application fetching" is used.

Under application fetching, an application requests an application-specified number of rows (application-specified fetch quantity). The fetch request, which is referred to herein as an application fetch request, is transmitted by the application to the client-side interface component, which requests that number of rows from the database instance. The client-side interface component returns the requested number of rows to the application, which stores the rows in an "application fetch buffer", a memory structure managed by the application. When the application requires more rows, it may generate additional application fetch requests, until all the rows of the result set are fetched from the database instance, thus completing the fetch phase of the cursor.

The size of an application fetch quantity affects performance and the use of memory on the client's computer. Bigger application-specified fetch quantities reduce network traffic by reducing the number of fetch requests needed to complete the fetch phase but require more memory on the client computer to store larger batches of fetched rows.

Smaller fetch quantities, on the other hand, require less memory on the client's computer but increase network traffic by increasing the number fetch requests needed to complete the fetch phase. Furthermore, cursors remain in the fetch state longer because fetching the entire result set for a cursor, which is being retrieved in smaller fetch quantities, takes relatively longer.

There are adverse consequences to cursors remaining in the fetch state longer. Some types of operations take longer to complete because the operations cannot be completed until all the cursors have left the fetch state. For example, migration of a session between database instances, as described in Transparent Session Migration Across Servers, cannot be completed until a session's cursor's are closed.

Another adverse consequence is that additional resources are consumed on the database server. These additional resources include resources that are directly consumed by cursors, such as memory for cursor state and memory for cached data blocks associated with any tables from which data is fetched for a cursor, and resources that are indirectly consumed, such as storage used for storing older undo information, which might be needed to return rows for a query based on an older snapshot (i.e. the state of a database at a previous point in time). This undo information is typically stored on disk, and can quickly increase in size.

Keeping cursors open longer increases the need to keep such old undo information around, thereby consuming more disk storage.

Unfortunately, many applications are not developed to establish application-specified fetch quantities in a way that accounts for performance and resource allocation factors. Furthermore, even if attempts are made to develop applications in this way, applications may not be able to access information needed to optimally determine fetch quantities.

Based on the foregoing, it is clearly desirable to provide an improved approach for determining the number of rows to fetch in a fetch request.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
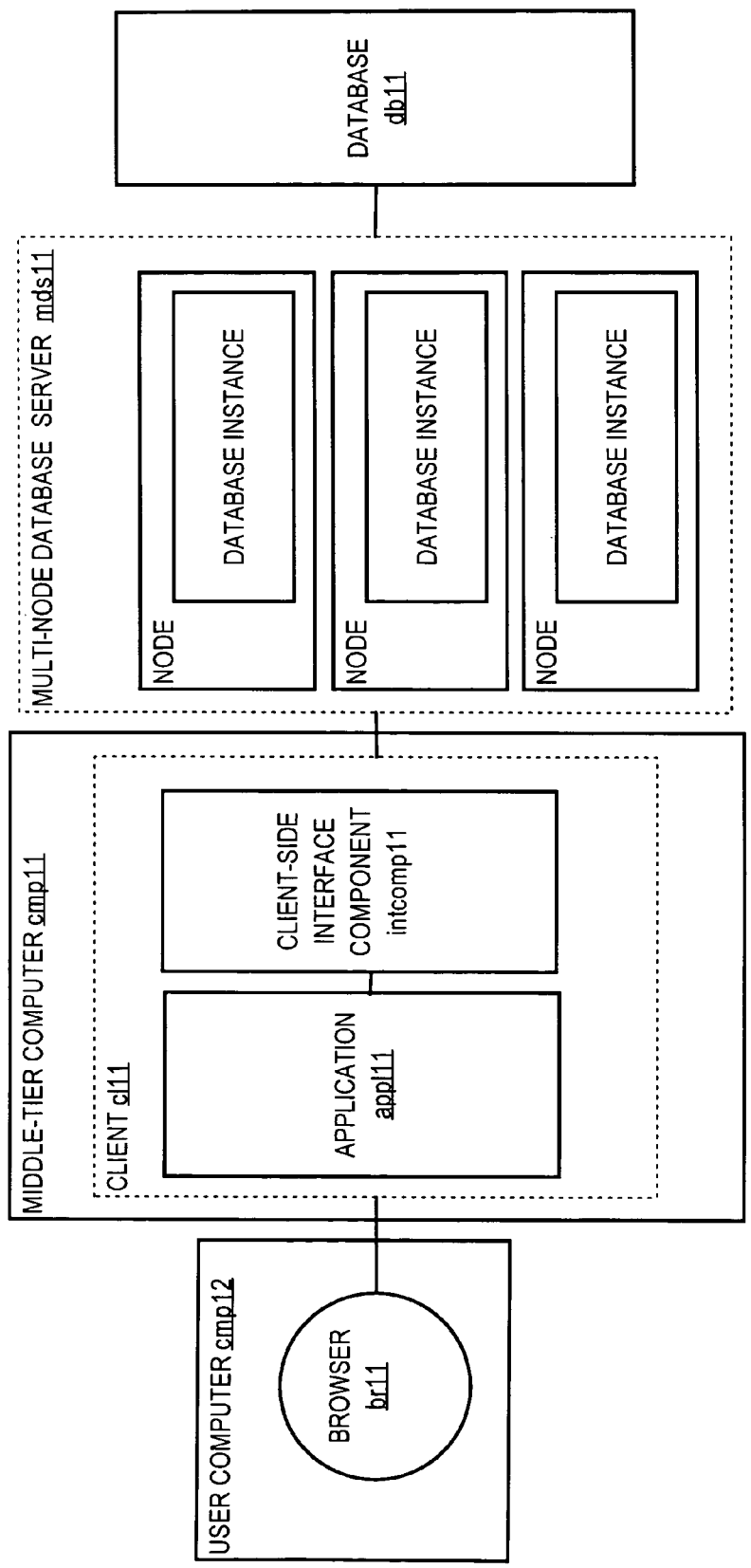
FIG. 1 is a block diagram of a multi-tier architecture for a computer system according to an embodiment of the present invention.

Approaches that may be used to transfer sessions in a multi-node environment are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for determining a quantity of rows to fetch based on memory available to store the rows in a buffer on a client computer, the fetch state of cursors associated with a session, and other information relevant to such a determination that is typically not available to applications. The techniques may allow better utilization of memory on a client computer to fetch and store larger quantities of rows for a given fetch request, and improve system and network performance.

In an embodiment of the present invention, the techniques are used to determine a quantity of rows for "pre-fetching". Under pre-fetching, rows in addition to those requested by an application fetch are fetched from a database instance and stored in a "pre-fetch buffer". The quantity of rows is referred to herein as a pre-fetch quantity. The pre-fetch quantities are based on an amount of memory that is deemed available for pre-fetch buffers on a client computer (i.e. a computer on which the client and/or application reside) and the number of cursors in the fetch state for a session at a given moment. Pre-fetch buffers managed by client-side interface components may be private to the client-side interface components. Application fetch requests are satisfied from the rows in a pre-fetch buffer. When there are an insufficient number of rows in the pre-fetch buffer to satisfy a particular application fetch request, the client-side interface component fetches another pre-fetch quantity of rows and stores them in the respective pre-fetch buffer.

In an embodiment of the present invention, pre-fetching is used to hasten session migration. By fetching a quantity of rows that is larger than would be fetched if only the application-specified quantity were fetched, the fetch phase of a cursor is completed sooner. An earlier completion of the fetch phase of a session's cursors allows migration of the session to be completed sooner and avoids the consumption of additional resources attendant to cursors remaining in the fetch state longer. Pre-fetching that is used for the purpose of hastening the completion of the fetch phase for a cursor is referred to herein as pre-fetch hastening.

An embodiment of the present invention is not limited to pre-fetch hastening for session migration. Pre-fetching may be used to reduce a number of fetch requests and improve system performance in other contexts.

Calculation of a Pre-Fetch Quantily

According to an embodiment of the present invention, the calculation of a pre-fetch quantity is based on a memory bound calculated for a cursor. The memory bound is an amount of memory that can be used for a cursor's pre-fetch buffer. Once the memory bound is determined, the pre-fetch quantity is calculated based on the memory bound and the size of rows fetched. Calculation of the memory bound is based on the following values.

ClnMemory: The total amount of memory on a client computer that is available for pre-fetch buffers for all sessions on a client computer. The amount may be based on a percentage of the total memory of the client computer. If the client computer is dedicated to running a single application that interfaces with a single database instance, then the percentage may be relatively higher, e.g. 10%. If the client computer is being used for other purposes than to execute a single application that interfaces with a database server, then the percentage can be lower. For example, if a client computer hosts an application server that establishes sessions on multiple database instances, then the percentage should be relatively low, e.g. 1 percent. The amount of memory on a client computer available may also be specified by a client.

ClnSessions: Number of sessions for the client computer hosted on the database instance.

OpenCursors: Number of open cursors for the session.

RateOfTx: Transmission rate of data from the database instance to the client computer.

RoundTrip: Round trip time for a message to be sent from the client computer to a database instance and the client to receive an acknowledgement of the message's receipt by the database instance.

Calculation of Pre-Fetch Quantity based on Pre-Fetch Memory Bound

Figure 2:
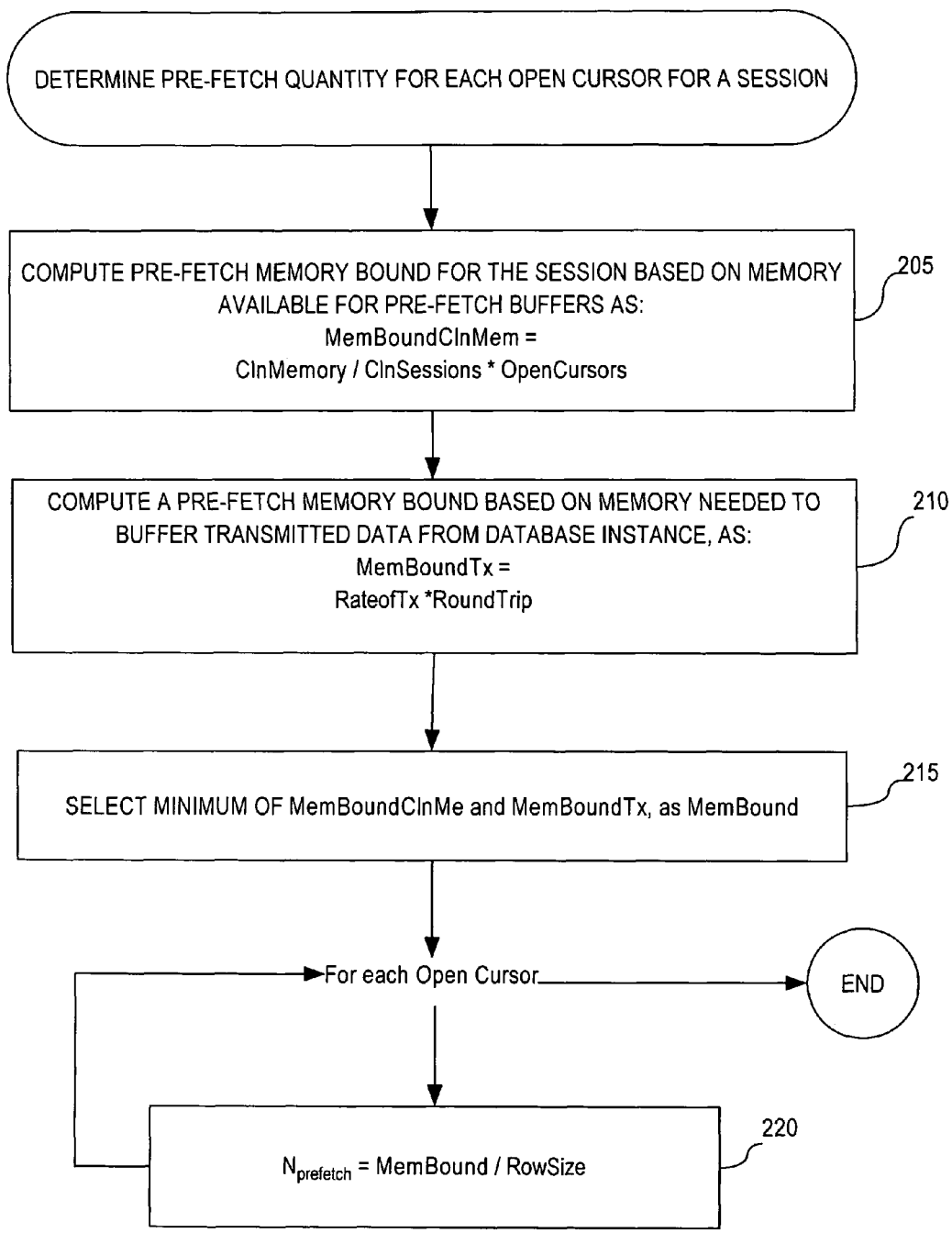
FIG. 2 is a flow chart depicting a process for determining a number of rows to fetch based on memory deemed available for storing fetched rows on a client computer and memory needed to buffer transmitted data, according to an embodiment of the present invention.

FIG. 2 is a flow chart of a process for determining a memory bound and a pre-fetch quantity according to an embodiment of the present invention.

Referring to FIG. 2, at step 205, a pre-fetch memory bound for a session on the database instance is computed based on memory available (ClnMemory) for pre-fetch buffers on the client's computer. This amount is referred to herein as MemBoundClnMem, and is calculated according to the following formula.

$$MemBoundClnMem=ClnMemory/ClnSessions*OpenCursors$$

The formula equally divides total memory available on a client computer for pre-fetch buffers between all sessions of a client computer on a database instance, and, for a given session, divides the memory for the session between the open cursors of the session.

At step 210, a pre-fetch memory bound is computed based on memory needed to buffer transmitted data from a database instance. This size is referred to herein as MemBoundTx, and is calculated according to the following formula.

$$MemBoundTx=RateofTx*RoundTrip$$

The above formula calculates the amount of data that can be received and stored within the time of a round trip. Many network protocols may require that a recipient of a data transmission be able to store a quantity of data equal to this amount. Specifically, such protocols store a unit of data received (e.g. packet) from a sender in a buffer before providing the data to an application. Before the unit of data is provided to the application and removed from the buffer, the protocols require that the recipient transmit a message to the transmitter and receive an acknowledgment. Between the transmission of the message and receipt of the acknowledgement, which corresponds to the round trip time, the recipient could continue to receive and buffer data from the database server at the rate of transmission. Thus, there must be enough memory to buffer all the data from the database instance that could possibly be received by the recipient between when the message is transmitted to the database server and the acknowledgment of the message is received by the client.

At step 215, the minimum of MemBoundClnMem and MemBoundTx is selected and established as MemBound.

At 220, for each open cursor, a prefetch quantity is computed, according to the following formula.

$$N_{prefetch}=MemBound/RowSize$$

Pre-Fetch Hastening for Session Migration

According to an embodiment of the present invention, a pre-fetch quantity is dynamically generated and that number of rows fetched for all cursors of a session in the fetch state. This measure hastens completion of the fetch phase of cursors in the fetch state and is referred to herein as pre-fetch hastening. Closing cursors sooner allows session migration to occur sooner.

Figure 3:
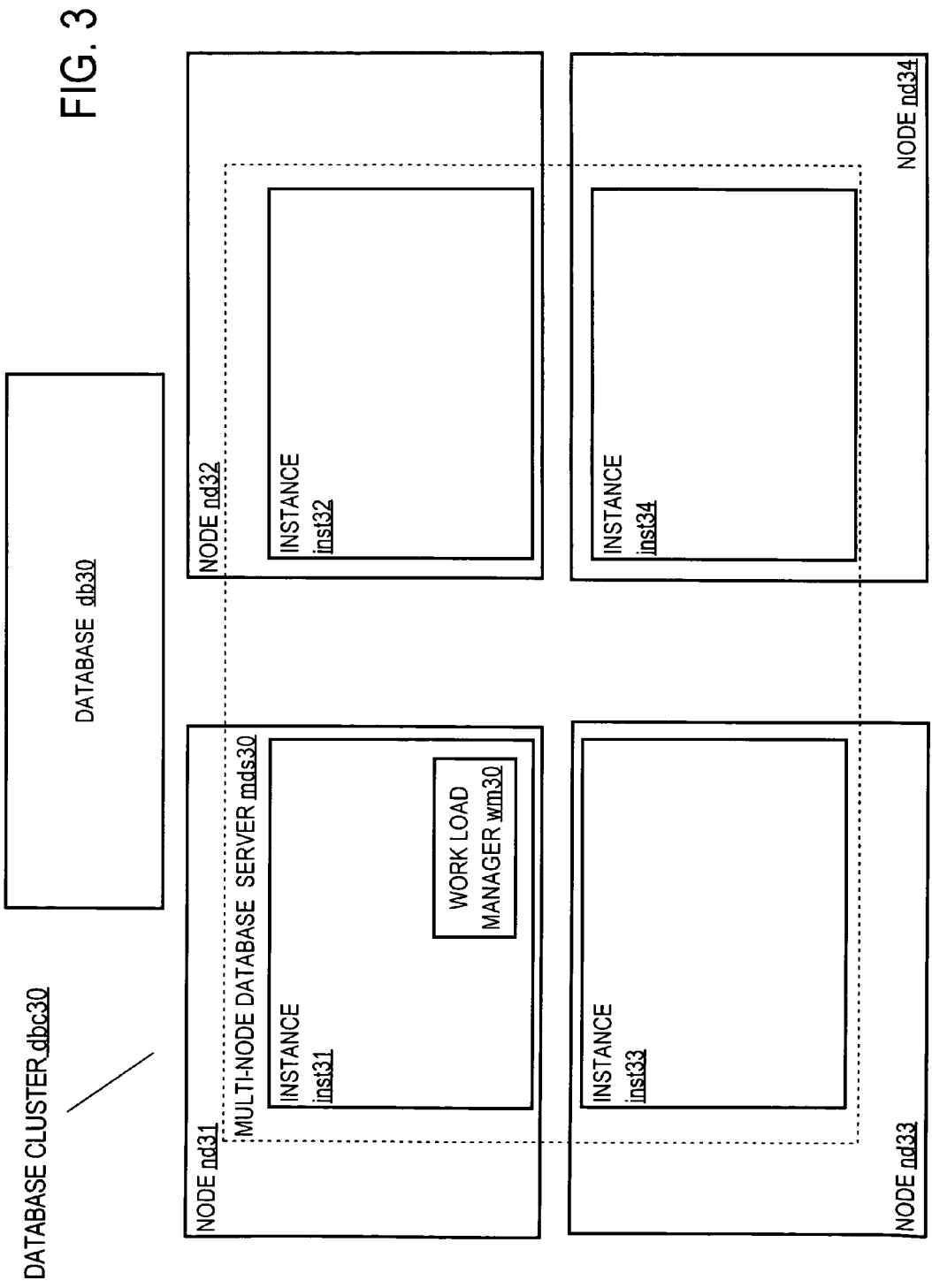
FIG. 3 is a block diagram showing a multi-node computer system on which an embodiment of the present invention may be implemented.

According to an embodiment, session migration is performed within a multi-node database server. FIG. 3 shows a multi-node database server that may be used to implement an embodiment pre-fetch hastening to hasten transparent session.

Illustrative Computer System

Referring to FIG. 3, it shows database cluster dbc30. A database cluster is a set of nodes that host a multi-node database server, such as multi-node database server mds30, that manages access to a particular database. Database cluster dbc30 includes nodes nd31, nd32, nd33, and nd34. The nodes of database cluster dbc30 provide some degree of shared storage (e.g. shared access to a set of disk drives) between the nodes. The nodes in database cluster dbc30 may be in the form of computers (e.g. work stations, personal computers) interconnected via a network, and may be part of a grid. Database server mds30 includes database instances inst31, inst32, inst33, and inst34.

Clients that connect to a database instance that is part of a multi-node database server to access the database managed by the database instance, are referred to herein as clients of the database instance, clients of the multi-node database server, or clients of the database. For example, a process on a computer not part of database cluster dbc30 executes an application and is connected to database instance inst33 to access database db30. The process is referred to as a client of database instance inst33, a client of multi-node database server mds30, and a client of database db30.

Work load manager wm30 is a process running on database cluster dbc30, and in particular, instance inst31, that is responsible for managing work load on the database instances hosted on database cluster dbc30. An example of a work load manager is a database director, described in *Incremental Run-Time Session Balancing*, which performs run-time session balancing by migrating one or more sessions from a source database instance to a destination database instance.

Sessions Established for Clients by a Listener

In order for a client to interact with multi-node database server mds30, the client transmits a database connection request to establish a session on a database instance. A listener receives the request. A listener is a process running on database cluster dbc30 that receives requests and directs them to a database instance within database cluster dbc30.

Once the database session is established for the client, the client may issue additional requests, which may be in the form of remote procedure invocations, and which include requests to begin execution of a transaction, to execute queries, to perform updates and other types of transaction operations, to commit or otherwise terminate a transaction, and to terminate a database session.

Illustrative Client and Source and Destination Instance

Figure 4:
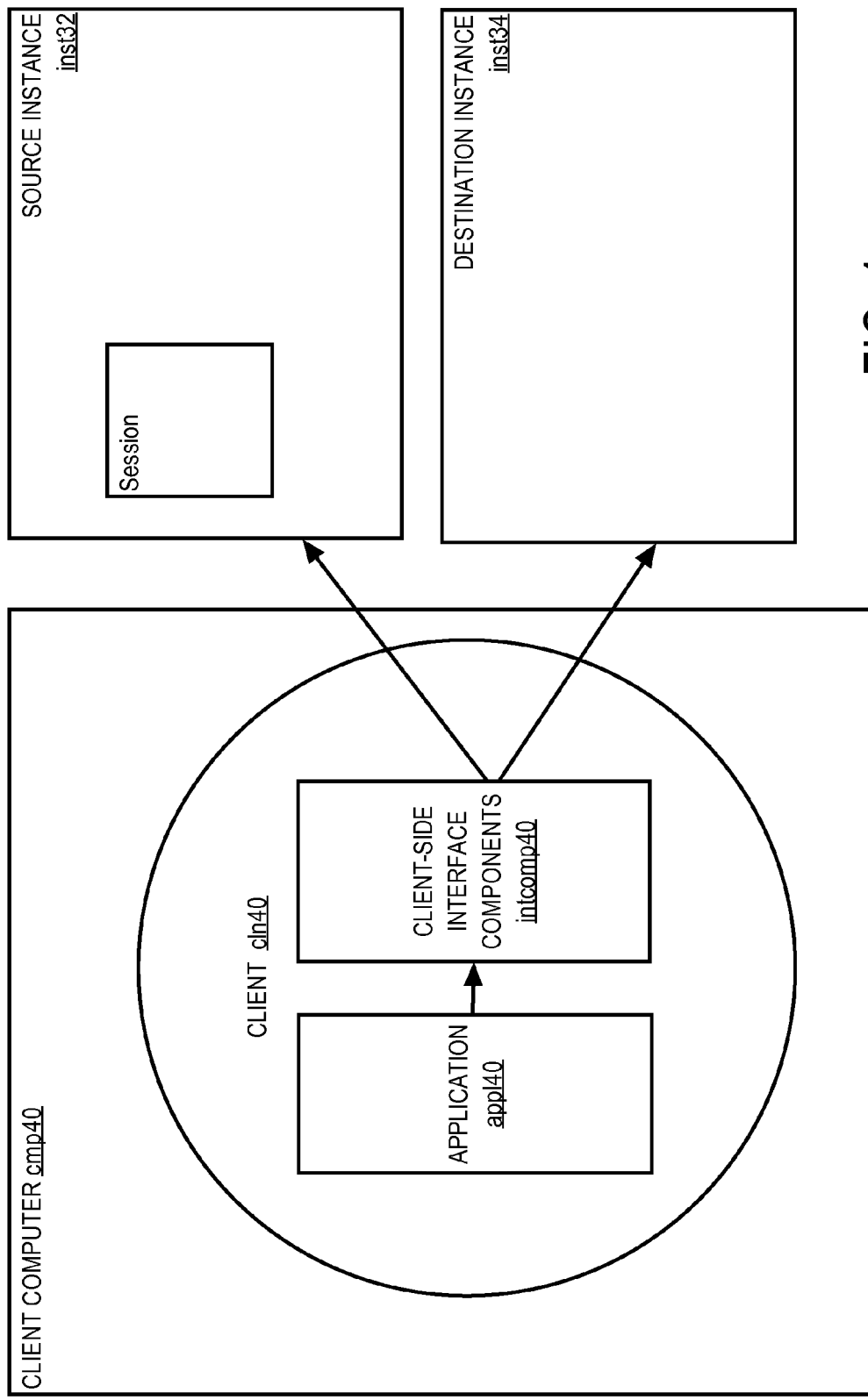
FIG. 4 is a block diagram depicting a client, source database instance, and destination database instance that participate in migrating a session according to an embodiment of the present invention.

FIG. 4 is a block diagram showing an illustrative client and source and destination instance used to illustrate transparent session migration according to an embodiment of the present invention. Referring to FIG. 4, it shows database instance inst32 and inst34 as source instance inst32 and destination instance inst34. Client cln40 is a process that is running on a client computer cmp40. Client computer cmp40 is a computer that is separate from any node in database cluster dbc30 and that hosts one or more database clients of database cluster dbc30, including client cln40. Clients hosted by client computer cmp40 include processes that execute an application, such as application appl40, which is executed by client cln40.

Application appl40 interacts with database cluster dbc30 and multi-node database server mds30 via client-side interface component intcomp40. Application appl40 includes invocations of routines (e.g. functions, procedures, object methods, remote procedures) of client-side interface component intcomp40. An example of a client-side interface component is the Oracle Call Interface ("OCI"), available from Oracle Corporation.

For purposes of exposition, software modules, such as application appl40, are described herein as performing particular actions, when in fact execution of the software by a process causes the process to perform those actions. For example, when an application appl40 is described as transmitting or receiving a message or accessing data, a process executing the application software is transmitting or receiving the message or accessing the data.

Calls

A call is a request made by a client to a server to execute a task. Typically, a call is made by a process executing an invocation of a routine in a software module. The invocation causes the process to execute the routine (such execution may itself entail calling and executing other routines), and then to return to execute the module to a point at or just beyond the invocation (or some other designated point e.g. exception handler).

A call may entail passing in one or more input parameters to the invoked routine and returning values as one or more output parameters. Messages may be transmitted as part of an input parameter and part of an output parameter. A call to a database instance typically is made to perform a task, such as executing a database statement. A message transmitted by the call may include a query string as an input parameter, and query results or a reference to their location as an output parameter.

A remote procedure call is a call of a routine made by a process in which another process, on the same or different node and/or computer, executes the called routine. The other process is referred to as the remote process. The call is made by transmitting a request to execute a routine to another process over a communication connection, such as a network connection. Also, input parameters and output parameters are transmitted over the connection. While the remote process executes the procedure, the calling process's execution is suspended or blocked.

A call causes the calling process or remote process to execute the called routine, which may cause calling and execution of other routines. The call terminates when the call returns. Operations, which are carried out as part of execution of a called routine, are referred as being made within the call.

For example, to make a call to database cluster dbc30, application appl40 makes a call of a function of client-side interface component intcomp40. In response to the invocation, client-side interface component intcomp40 executes the call, which entails client-side interface component intcomp40 modifying and accessing "local" data stored in the memory of client computer cmp40 by client-side interface component intcomp40, and client-side interface component intcomp40 making multiple remote procedure calls to source instance inst32, the multiple remote procedure calls including a first remote procedure call and a second remote procedure call. In response to the first remote procedure call, source instance inst32 performs various operations. The modification and access of the local data, the multiple remote procedure calls, and the various operations performed by source instance inst32, are referred to as being performed within the "application call" made by application appl40. The various operations performed by source instance inst32 while executing the routine invoked by the first remote procedure call (which may entail execution of other routines) are referred to herein as being made within the first remote procedure call, within a client-side call because the first remote procedure call was made by the client-side interface component intcomp40, and within an application call because the remote procedure call was made by client-side interface component intcomp40 while executing a routine called by application appl40. An application call or client-side call may both be referred to herein as a client call.

Transparent Session Migration

In transparent session migration, session migration is initiated by an entity that determines and/or requests that a set of sessions be migrated. For example, work load manager wm30 may request that a session be migrated from source instance inst32 to destination instance inst34 to shift work load from source instance inst32 to destination instance inst34. Work load manager wm20 transmits a request to source instance inst32 to initiate migration of the selected session.

In response, source instance inst32 initiates a session migration protocol in which messages are passed between client cln40 (via client-side interface component intcomp40) and source instance inst32, and actions are taken in response to those messages. In general, actions taken in the protocol by source instance inst32 are taken while responding to calls made by client cln40 that would have made even if the session was not otherwise selected migration. For example, a session for client cln40 is selected for migration. Subsequently, cln40 calls source instance inst32 to request execution of a query. The call prompts source instance inst32 to send a "SELECTED" message by returning it as an output value of the call. The SELECTED message informs client cln40 that the selected session has been selected for migration, prompting client cln40 to initiate actions described further below. Client cln40 makes subsequent calls to source instance inst32 to, for example, fetch rows from the result set for the query. During each of these calls source instance inst32 determines whether migration criteria is satisfied, e.g. no cursors are open. When during the last of these calls, source instance inst32 determines that migration criteria is satisfied, source instance inst32 transmits a prepare-to-migrate message, as an output parameter, to client cln40, informing the client to undertake further steps to migrate the session. Such steps are described in *Transparent Session Migration Across Servers*.

Pre-Fetch Hastening

Figure 5:
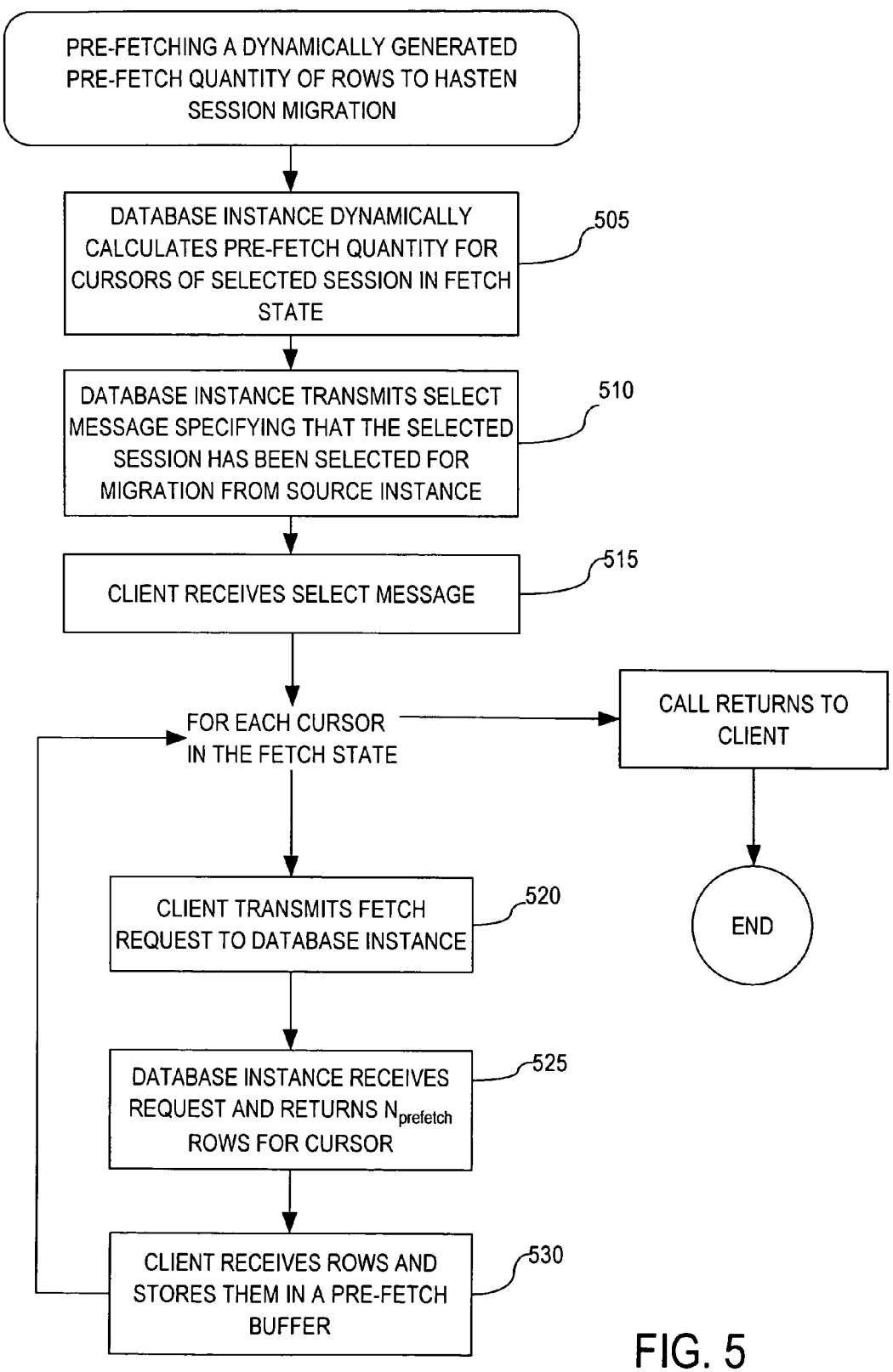
FIG. 5 is a flow chart for depicting a process for pre-fetching rows for cursors performed when a session is selected for migration according to an embodiment of the present invention.

FIG. 5 is a flow chart depicting a procedure performed when session migration of a selected session is commenced. Hence, the procedure is referred to as pre-fetch initiation. The procedure may be incorporated into the actions of a session migration protocol followed by source instance inst32; however, for purposes of exposition, all actions of the protocol are not depicted or described herein. The procedure is triggered, when subsequent to source instance inst32 receiving a request to migrate a selected session of a client, the client-side interface component intcomp40 makes a call to the database instance. The procedure fetches a pre-fetch quantity of rows for each cursor in the fetch state of a selected session. As a result, some or all the result set rows for the cursors in the fetch state are fetched, thereby possibly closing some or all cursors that were in the fetch state.

At step 505, source instance inst32 dynamically calculates pre-fetch quantity $N_{prefetch}$ for the cursors of the selected session in the fetch state, following the procedure depicted in FIG. 2. As mentioned before, this calculation depends on certain values, which are determined as specified below.

ClnMemory A client reports to the source instance inst32 the amount of computer memory on the client's computer when the client establishes a database session on database instance inst32. Source instance inst32 calculates ClnMemory as 1% of the reported amount of memory. The percentage can vary as explained earlier.

ClnSessions: Database instance inst32 associates a client computer identifier for each client computer for which a session is established on database instance inst32. ClnSessions is equal to the number of sessions associated with the client computer identifier of the selected session i.e. the client computer identifier of the client computer hosting the client for which the selected session was established.

OpenCursors: A database instance tracks which cursors are associated with which session, allowing the database server to determine the number of cursors for the session in the fetch state.

RateOfTx: When the client establishes a database session, the database instance inst32 pings the client to measure the RateOfTX and RoundTrip time.

RoundTrip: See above paragraph.

At step 510, source instance inst32 transmits a select message to the client-side interface component 40 specifying that the selected session has been selected for migration. At step 515, the client-side interface component intcomp40 receives the selected message.

Next, the client-side interface component executes a loop in which it performs steps 520-530 for each of the selected session's cursors in the fetch state. At step 520, client-side interface component intcomp40 transmits a fetch request to source instance inst32 At step 525, database instance inst32 receives the request and returns $N_{prefetch}$ rows for the cursor. At step 530, client-side interface component intcomp40 receives the $N_{prefetch}$ rows and stores them in a pre-fetch buffer.

After performing the loop for each cursor in the fetch state, execution proceeds to step 530 where the call returns to the application.

Once $N_{prefetch}$ have rows have been fetched for each cursor in the fetch state, it is possible that all the rows of the result set for each of the cursors have been fetched from database instance inst32 and stored in a pre-fetch buffer. As a result, all the cursors are closed and migration criteria that depends on the cursors being closed may be satisfied, allowing session migration to proceed sooner than if fetching was based solely on application fetching. Subsequent application fetch requests by the application will be satisfied from rows in the pre-fetch buffer.

It is also possible that unfetched rows remain stored on a database instance inst32 for some of the cursors of the session. In this case, client-side interface component intcomp40 fetches more rows from database instance inst32 when application fetch requests cannot be completely satisfied from rows in the pre-fetch buffer.

Pre-Fetching Subsequent to Pre-Fetching Initiation

Figure 6:
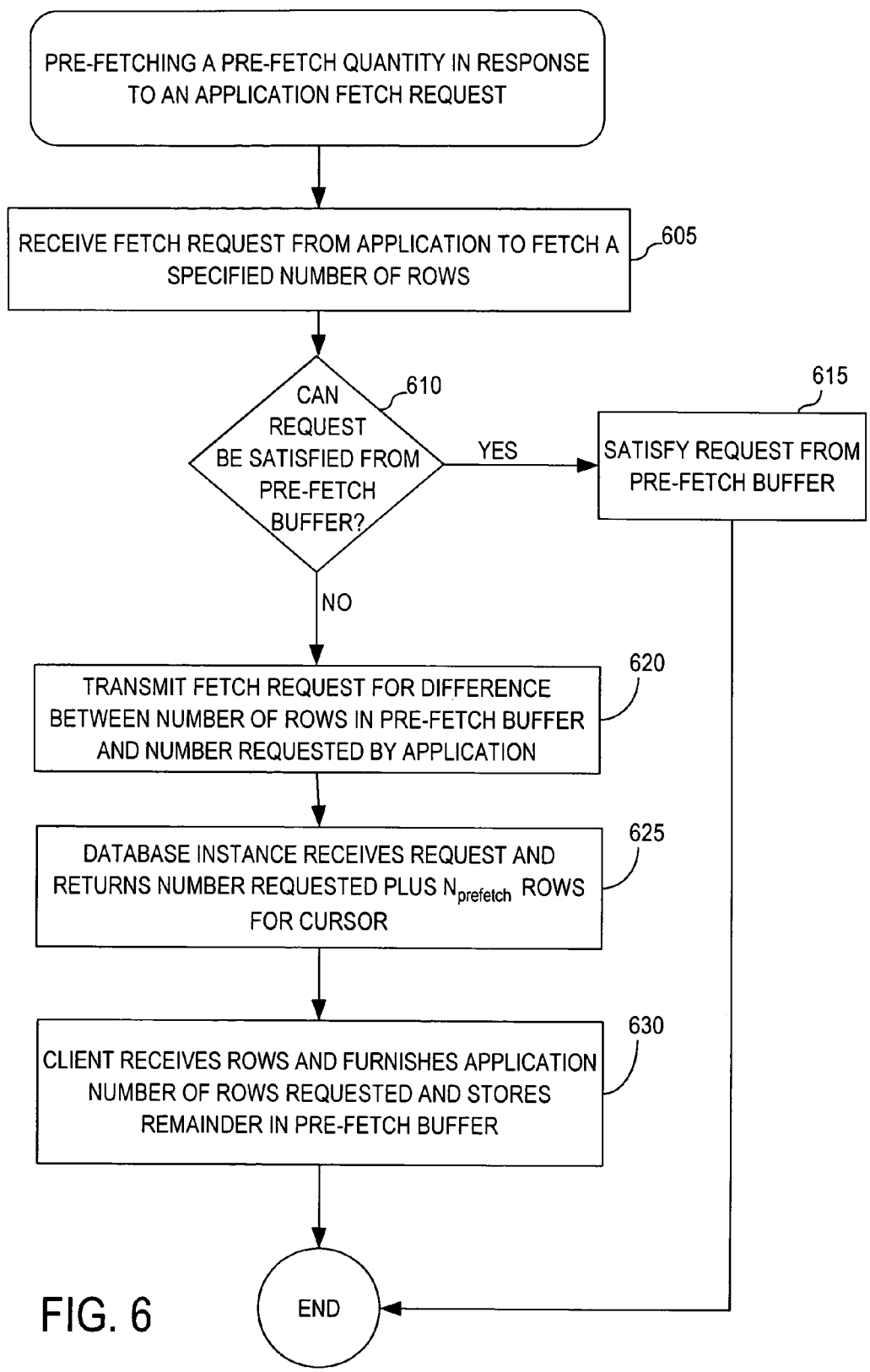
FIG. 6 is a flow chart for depicting a process for pre-fetching rows in response to fetch requests by applications according to an embodiment of the present invention.

FIG. 6 shows a procedure that is performed in response to fetch requests made when, after performing pre-fetch initiation, unfetched rows in the result set of a cursor remain on database instance inst32.

Referring to FIG. 6, at step 605, client-side interface component intcomp40 receives a request (i.e. a call) from application appl40 to fetch an application-specified number of rows.

At step 610, client-side interface component intcomp40 determines whether the request can be satisfied from the pre-fetch buffer. If so, then at step 615, the request is satisfied using only rows from the pre-fetch buffer. Otherwise, execution proceeds to step 620.

At step 620, client-side interface component intcomp40 transmits a fetch request for the difference between the number of rows in the pre-fetch buffer and the number of rows requested by the application.

At step 625, source instance inst32 receives the fetch request and returns the number of rows requested plus $N_{prefetch}$ rows, or less if there are less unfetched rows in the result set stored on source instance inst32.

At step 630, client-side interface component intcomp40 receives the rows, furnishes the application with up to the number of rows requested, and stores the remainder in the pre-fetch buffer.

After a number of iterations of the procedure shown in FIG. 6, all rows for the result sets of all cursors may be fetched and stored in pre-fetch buffers. Because all cursors may be closed, it is possible that the selected session may be migrated (assuming other migration criteria is satisfied). All rows generated for the result set are stored in the pre-fetch buffer, and, as a consequence, the rows provided to an application from a pre-fetch buffer satisfy consistency requirements of transaction oriented processing.

Example Scenario

The following scenario is used to illustrate pre-fetch hastening according to an embodiment of the present invention. For purposes of exposition, memory is measured in terms of gigabytes (gb), megabytes (mb), and kilobytes (kb), where gb equals 1 billion bytes, mb equals 1 million bytes, and kb equals one thousand bytes. Source instance inst32 has received a request to migrate a selected session of client cln40 and has not yet sent a selected message to client cln40. Other pertinent values are listed in table A, as follows

TABLE A

| | |
|---|---|
| Memory on client computer cmp40 | 1 gb |
| ClnMemory (1% of 1 gb) | 10 mb |
| ClnSessions | 20 |
| OpenCursors | 50 |
| RateOfTx | 10 mb/sec |
| RoundTrip | 10 ms (milliseconds) |

For the selected session, there are two cursors in the fetch state, cursors A and B. The pertinent values with respect to the cursors are listed in table B, as follows:

TABLE B

| | Row Size | Number of Unfetched Rows in Result Set | Application-Specified fetch quantity |
|---|---|---|---|
| Cursor A | 200 | 30 | 5 |
| Cursor B | 500 | 42 | 6 |

Referring to FIG. 5, at step 505, database instance inst32 calculates $N_{prefetch}$ according to FIG. 2. At step 205, the memory bound for the selected session, MemBoundClnMem, is calculated as:

ClnMemory/ClnSessions*OpenCursors=10 mb/ (500*2)=10 kb

At step 210, the memory needed to buffer data transmitted from source instance inst32 to the client is computed. This size is referred to herein as MemBoundTx, and is calculated according to the following formula.

At step 210, the maximum amount of memory needed to buffer data transmitted from the database instance inst32, MemBoundTx, is calculated as:

MemBoundTx=RateofTx*RoundTrip10 meg/sec*10 milliseconds=100 kb

At step 215, the minimum of MemBoundClnMem and MemBoundTx is determined, which is 10 kb.

At step 505, $N_{prefetch}$ is determined for each of the cursors in the fetch state based on the formula $N_{prefetch}$=MemBound/RowSize, as follows.

Cursor A: $N_{prefetch}$=10 k/200b=50 rows
Cursor B: $N_{prefetch}$=10 k/500b 20 rows At step 510, source database instance inst32 transmits a SELECT message to client-side interface component intcomp40, which receives it at step 515. In the loop of steps 520 through 530, for each of cursors A and B, client-side interface component intcomp40 transmits a fetch request to database instance inst32 and database instance inst32 returns $N_{prefetch}$ rows (or less) for each cursor, which are received and stored in a pre-fetch buffer by client-side interface component intcomp40. As a result, for cursor A, 30 rows are received, leaving no unfetched rows for cursor A on database instance inst32; for cursor B, 20 rows are received, leaving 22 unfetched rows for cursor B on database instance inst32.

Subsequently, application appl40 requests three fetches of 6 rows. In each, client-side interface component intcomp40 determines at step 610 that the request can be satisfied by rows in the pre-fetch buffer and satisfies the requests at 615, leaving 2 rows in the pre-fetch buffer.

Finally, application appl40 requests another fetch of 6 rows. Client-side interface component intcomp40 determines at step 610 that the request cannot be satisfied by rows in the pre-fetch buffer because there are only 2 in there. At step 620, client-side interface component intcomp40 transmits a request for the difference between rows requested by the application and the rows in the pre-fetch buffer, which is 4 rows.

At step 625, database instance inst32 receives the request. There are 22 rows in result set stored on source instance inst32, which is less than the sum of $N_{prefetch}$ rows plus the amount requested, which is 24 (20+4). Therefore, source instance inst32 returns all the unfetched rows of the result set for cursor B.

Other Embodiments

Pre-fetching has been illustrated in the context of session migration, but use of pre-fetching approaches described herein is not limited to this context. For example, pre-fetching may be used to improve efficiency whenever cursors are processed for applications by database servers. As cursors are created for a particular application, a new pre-fetch quantity is generated and rows pre-fetched for that cursor accordingly. When a database instance is shut down, pre-fetch hastening can be used to hasten the closing of cursors, which allows the database instance to be shut down more quickly.

The present invention is not limited to any particular type of database system. In database systems, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein is that typically associated with relational databases. Thus, the terms "table", "row" and "column" shall be used herein to refer respectively to the data container, record, and field.

Hardware Overview

Figure 7:
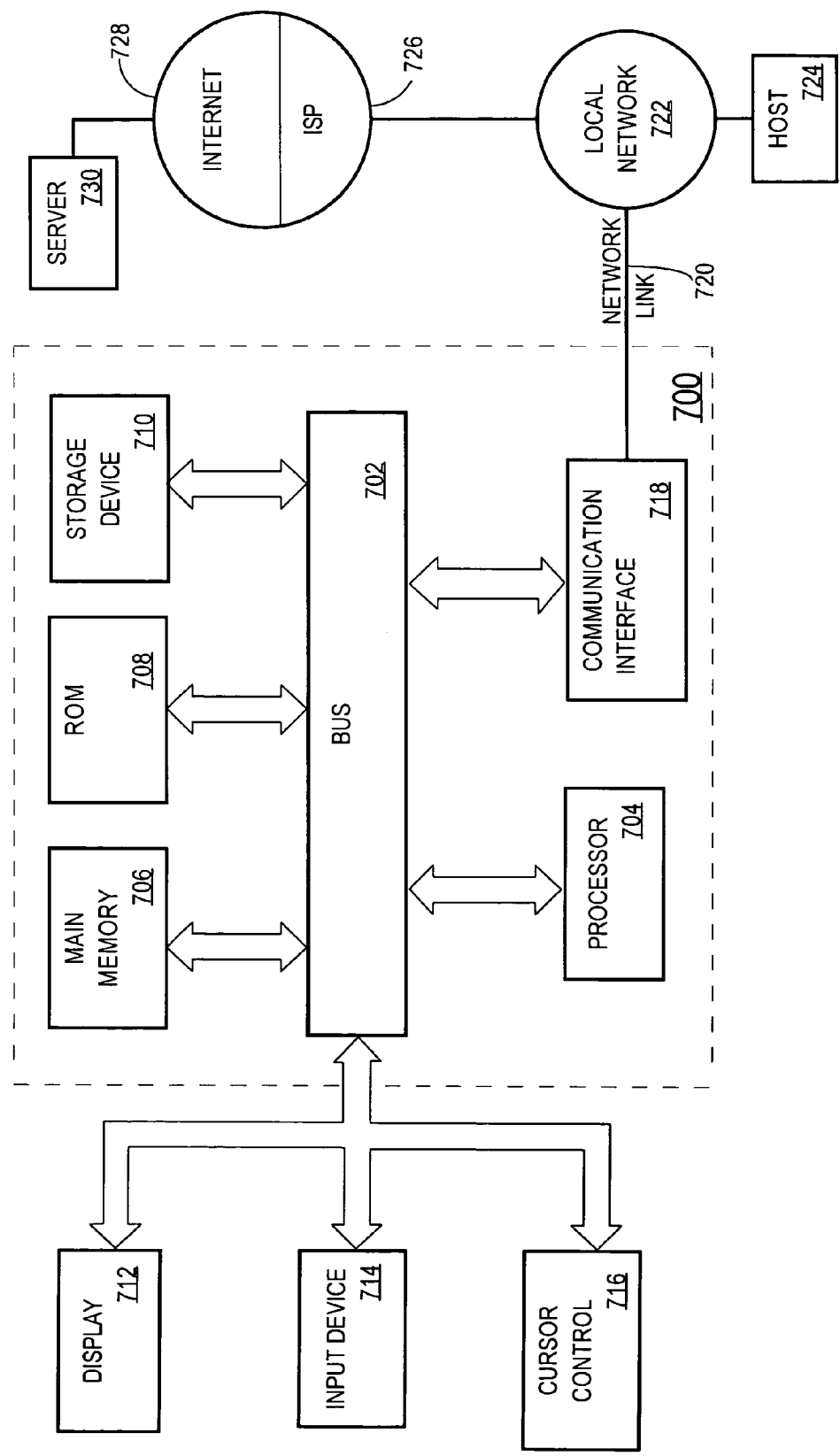
FIG. 7 is a block diagram of a computer system that may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, the method comprising the steps of:
    satisfying at least one fetch request using a first cursor of a plurality of cursors, wherein each cursor of said plurality of cursors is stored on a database server and holds information about execution of a respective query issued for a client running on a computer;
    after satisfying at least one fetch request using the first cursor of the plurality of cursors, determining a first amount of memory of said computer on which said client of the database server is running, said first amount of memory being available to said client for storing records generated by the database server for said first cursor, wherein determining the first amount of memory includes:
        (1) determining a respective cursor state of each cursor of said plurality of cursors, said respective cursor state being one of a plurality of cursor states, each cursor state of said plurality of cursor states representing a phase of execution of said respective query, and
        (2) determining a second amount of memory available to said client running on the computer;
    determining a first quantity of records to pre-fetch based on the first amount of memory; and
    in response to the database server receiving another fetch request for a certain quantity of records, satisfying said another fetch request using said first cursor by returning at least the first quantity of pre-fetched records to the client.

2. The method of claim 1, the steps further including in response to the database server receiving said another fetch request, determining a second quantity of records to return to satisfy the another fetch request based on the first quantity of records and the certain quantity of records requested by said another fetch request.

3. The method of claim 2, wherein the step of determining a second quantity of records includes determining to return at least a sum of the first quantity of records and the certain quantity of records requested by the another fetch request.

4. The method of claim 1, wherein determining a first amount of memory and determining a first quantity of records is performed by the database server in response to the database server receiving a request to migrate a session.

5. The method of claim 1, wherein in response to the database server receiving a request to migrate a session, the database server transmits a message to the client, wherein the message causes the client to generate said another fetch request.

6. The method of claim 5, wherein the client generates said another fetch request within a call made by an application, and wherein said another fetch request is made before the call returns to the application.

7. The method of claim 1, wherein determining a first quantity of records is based on:
    a number of sessions established on said database server for clients that reside on said computer;
    a number of open cursors associated with a particular session of said sessions; and
    a size of records generated for the particular cursor.

8. The method of claim 1, wherein determining the first quantity of records is based on:
the second amount of memory used to store data received over a network before a network protocol makes the data available to a requestor of said data;
a number of open cursors associated with a particular session; and
a size of records generated for a particular cursor of said open cursors.

9. The method of claim 1, wherein determining the first quantity of records is based on:
the second amount of memory calculated based on:
a number of sessions established on said database server for clients that reside on said computer,
a number of open cursors associated with a particular session of said sessions, and
a size of records generated for a particular cursor of said open cursors;
a third amount of memory calculated based on:
an amount of memory used to store data received over a network before a network protocol makes the data available to a requestor of said data,
the number of open cursors associated with the particular session of said sessions, and
the size of records generated for the particular cursor of said open cursors; and
the minimum of the second amount and the third amount.

10. A computer-readable non-transitory storage medium storing one or more sequences of instructions which, when executed by one or more processors, cause:
satisfying at least one fetch request using a first cursor of a plurality of cursors, wherein each cursor of said plurality of cursors is stored on a database server and holds information about execution of a respective query issued for a client running on a computer;
after satisfying at least one fetch request using the first cursor of the plurality of cursors, determining a first amount of memory of said computer on which said client of the database server is running, said first amount of memory being available to said client for storing records generated by the database server for said first cursor, wherein determining the first amount of memory includes:
(1) determining a respective cursor state of each cursor of said plurality of cursors, said respective cursor state being one of a plurality of cursor states, each cursor state of said plurality of cursor states representing a phase of execution of said respective query, and
(2) determining a second amount of memory available to said client running on the computer;
determining a first quantity of records to pre-fetch based on the first amount of memory; and
in response to the database server receiving another fetch request for a certain quantity of records, satisfying said another fetch request using said first cursor by returning at least the first quantity of pre-fetched records to the client.

11. The computer-readable non-transitory storage medium of claim 10, wherein the one or more sequences of instructions further include instructions, that when executed by said one or more processors, cause, in response to the database server receiving said another fetch request, determining a second quantity of records to return to satisfy the another fetch request based on the first quantity of records and the certain quantity of records requested by said another fetch request.

12. The computer-readable non-transitory storage medium of claim 11, wherein determining a second quantity of records includes determining to return at least a sum of the first quantity of records and the certain quantity of records requested by the another fetch request.

13. The computer-readable non-transitory storage medium of claim 10, wherein determining a first amount of memory and determining a first quantity of records is performed by the database server in response to the database server receiving a request to migrate a session.

14. The computer-readable non-transitory storage medium of claim 10, wherein the one or more sequences of instructions further include instructions, that when executed by said one or more processors, cause the database server to perform the step of transmmitting a message to the client in response to the database server receiving a request to migrate a session, wherein the message causes the client to generate said another fetch request.

15. The computer-readable non-transitory storage medium of claim 14, wherein the client generates said another fetch request within a call made by an application, and wherein said another fetch request is made before the call returns to the application.

16. The computer-readable non-transitory storage medium of claim 10, wherein determining a first quantity of records is based on:
a number of sessions established on said database server for clients that reside on said computer;
a number of open cursors associated with a particular session of said sessions; and
a size of records generated for the particular cursor.

17. The computer-readable non-transitory storage medium of claim 10, wherein determining the first quantity of records is based on:
the second amount of memory used to store data received over a network before a network protocol makes the data available to a requestor of said data;
a number of open cursors associated with a particular session; and
a size of records generated for a particular cursor of said open cursors.

18. The computer-readable non-transitory storage medium of claim 10, wherein determining the first quantity of records is based on:
the second amount of memory calculated based on:
a number of sessions established on said database server for clients that reside on said computer,
a number of open cursors associated with a particular session of said sessions, and
a size of records generated for a particular cursor of said open cursors;
a third amount of memory calculated based on:
an amount of memory used to store data received over a network before a network protocol makes the data available to a requestor of said data,
the number of open cursors associated with the particular session of said sessions, and
the size of records generated for the particular cursor of said open cursors; and
the minimum of the second amount and the third amount.

* * * * *

UNITED STATES PATENT AND TRADEMARK OFFICE
CERTIFICATE OF CORRECTION

| | | |
|---|---|---|
| PATENT NO. | : 9,489,424 B2 | Page 1 of 1 |
| APPLICATION NO. | : 11/018101 | |
| DATED | : November 8, 2016 | |
| INVENTOR(S) | : Kaluskar, et al. | |

It is certified that error appears in the above-identified patent and that said Letters Patent is hereby corrected as shown below:

In the Specification

In Column 6, Line 35, delete "Quantily" and insert -- Quantity --, therefor.

In Column 8, Line 56, delete "app140," and insert -- appl40, --, therefor.

In Column 11, Line 12, delete "RateOffx:" and insert -- RateOfTx: --, therefor.

In Column 12, Line 27, delete "follows" and insert -- follows: --, therefor.

In the Claims

In Column 18, Line 18, in Claim 14, delete "transmmitting" and insert -- transmitting --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*